(12) United States Patent
Liu et al.

(10) Patent No.: US 11,945,464 B2
(45) Date of Patent: Apr. 2, 2024

(54) METHOD FOR ASSESSING SAFETY OF THE INTENDED FUNCTIONALITY OF AUTONOMOUS DRIVING BASED ON DAG BLOCK CHAIN, AND DEVICE

(71) Applicants: East China Normal University, Shanghai (CN); Shanghai Trusted Industrial Control Platform Co., Ltd., Shanghai (CN)

(72) Inventors: Hong Liu, Shanghai (CN); Zhonglin Hou, Shanghai (CN); Geguang Pu, Shanghai (CN)

(73) Assignees: East China Normal University, Shanghai (CN); Shanghai Trusted Industrial Control Platform Co., Ltd., Shanghai (CN)

( * ) Notice: Subject to any disclaimer, the term of this patent is extended or adjusted under 35 U.S.C. 154(b) by 519 days.

(21) Appl. No.: 17/355,611

(22) Filed: Jun. 23, 2021

(65) Prior Publication Data
US 2021/0403029 A1 Dec. 30, 2021

(30) Foreign Application Priority Data
Jun. 29, 2020 (CN) .......................... 202010604592.3

(51) Int. Cl.
*B60W 60/00* (2020.01)
*B60W 10/18* (2012.01)
*B60W 50/02* (2012.01)
*B60W 50/14* (2020.01)
*G06F 16/27* (2019.01)
(Continued)

(52) U.S. Cl.
CPC .......... *B60W 60/001* (2020.02); *B60W 10/18* (2013.01); *B60W 50/0205* (2013.01); *B60W 50/14* (2013.01); *G06F 16/27* (2019.01); *G06Q 20/389* (2013.01); *H04L 9/3236* (2013.01); *B60W 2420/403* (2013.01);
(Continued)

(58) Field of Classification Search
CPC .............. B60W 60/001; B60W 10/18; B60W 50/0205; B60W 50/14; B60W 2420/408; B60W 2420/403; G06F 16/27; G06Q 20/389; H04L 9/3236; H04L 9/50; H04L 2209/84
See application file for complete search history.

(56) References Cited

U.S. PATENT DOCUMENTS

11,112,795 B1 * 9/2021 Mandi .................. G08G 1/0133
2018/0011496 A1 * 1/2018 Fairfield ............ B60W 60/0011
(Continued)

*Primary Examiner* — Hussein Elchanti
(74) *Attorney, Agent, or Firm* — Siritzky Law, PLLC (57) ABSTRACT

A method for assessing Safety Of The Intended Functionality of autonomous driving based on DAG block chain is provided. The method is based on DAG block chain technology and fused with system of the intended functionality, realizing safety assessment of the intended functionality. The intended functionality is objectively assessed based on data. The assessment method, in combination with an in-the-loop test, analyzes the current test data, without relying on a large amount of traditional experience to make judgments. Result of credit assessment of the nodes is taken as a result of safety assessment. Each of hardware or components is analyzed in terms of the safety and reliability, and the result of assessment is relatively complete. A device and a computer-readable storage medium are further provided.

17 Claims, 2 Drawing Sheets

(51) Int. Cl.
*G06Q 20/38* (2012.01)
*H04L 9/32* (2006.01)
*H04L 9/00* (2022.01)

(52) U.S. Cl.
CPC .......... *B60W 2420/408* (2024.01); *H04L 9/50* (2022.05); *H04L 2209/84* (2013.01)

(56) References Cited

U.S. PATENT DOCUMENTS

| | | | |
|---|---|---|---|
| 2018/0061230 A1* | 3/2018 | Madigan | G08G 1/0112 |
| 2020/0089246 A1* | 3/2020 | McGill, Jr. | G05D 1/0214 |
| 2020/0264605 A1* | 8/2020 | Chi-Johnston | B60W 60/0011 |
| 2020/0356828 A1* | 11/2020 | Palanisamy | G05D 1/0088 |

* cited by examiner

METHOD FOR ASSESSING SAFETY OF THE INTENDED FUNCTIONALITY OF AUTONOMOUS DRIVING BASED ON DAG BLOCK CHAIN, AND DEVICE

CROSS REFERENCE TO RELATED APPLICATION

This patent application claims the benefit and priority of Chinese Patent Application No. 202010604592.3 filed on Jun. 29, 2020, the disclosure of which is incorporated by reference herein in its entirety as part of the present application.

TECHNICAL FIELD

The disclosure relates to a technical field of Safety Of The Intended Functionality (SOTIF) of autonomous driving technology, and in particular, to a method for assessing SOTIF of autonomous driving based on block chain, and to a device.

BACKGROUND

In the area of the autonomous driving technology, safety research is increasingly becoming well-rounded with maturation of the autonomous driving technology. In terms of the safety of the autonomous driving, SOTIF has become a focus of study on autonomous driving safety of road vehicles, in addition to information security and function safety. The SOTIF is generally induced by non-system faults or human misuse that may be unknown or uncertain. The research becomes even challenging due to the unknown and uncertain triggering events in the SOTIF.

Although many universities and research institutes have now proposed some solutions, researches on the SOTIF in domestic are still in their infancy. The existing solutions include mainly safety analysis of the triggering events based on calculation results of both a probability that triggering events occur and a tolerance to the triggering events, and simulation of autonomous driving algorithms based on a Carsim dynamic model in conjunction with Simlink followed by emulation by virtue of dSPACE.

In the above solutions, the unknown and uncertain characteristics of the triggering events are not taken into consideration, and judgments may only be made based on the existing triggering event database, which require support from a large amount of data. However, there lacks a research foundation relying on big data at the initial stage of research on the SOTIF.

SUMMARY

The disclosure proposes a method for assessing SOTIF of autonomous driving based on block chain, which, based on Directed Acyclic Graph (DAG) block chain technology, integrates intended functional systems to realize safety assessment of the intended functionalities. Objective assessment may be performed on the safety of intended functionalities based on data. To this end, instead of relying on a large number of traditional experiences to make the judgement, the assessment is made by incorporating an in-the-loop test, so as to analyze current test data. A result of credit assessment for nodes may be employed as a result of the safety assessment. In this way, hardware or components each undergo analysis of the safety and reliability, and thus the result of the assessment is comparatively complete.

The disclosure proposes a method for assessing SOTIF of autonomous driving based on a DAG block chain, including step 1: generating respective full nodes, light nodes and a specific full node manager for all hardware participating in an in-the-loop test, assigning a corresponding public-private key pair, and creating a credit account for all of the full nodes and the light nodes except the manager node and presetting a credit coin of equal amount; step 2: at a data simulation stage, slicing test data in units of test scenes, and outputting a DAG block chain subsequent to inputting of the data of the time slice, and during data simulation, taking the data generated from each node as a transaction, a transaction process being that, prior to connecting to the DAG block chain, a new transaction is required to verify two transactions having been connected to the chain, and verification of the transaction follows an established transaction verification rule; step 3: backtracing transaction path according to a transaction path backtracing rule, and imparting a credit incentive or a credit penalty for the nodes based on a result of the backtracing; and step 4: subsequent to the end of the in-the-loop test, outputting credit account balance of each node, and characterizing a hazard of a corresponding node by means of the credit account balance.

A method for assessing SOTIF of autonomous driving based on DAG block chain proposed by the disclosure may include the following steps.

Step 1: data initialization stage, in which nodes are firstly initialized to generate respective full nodes or light nodes and a specific full node manager for all hardware participating in an in-the-loop test, to assign a corresponding public-private key pair, and to create a credit account for all the full nodes and the light nodes except the manager node and preset a credit coin of equal amount.

Step 2: data simulation. At the data simulation stage, test data is needed to be sliced in units of test scenes firstly, and each time slice corresponds to a test scene. Data of the slice are input sequentially in chronological order, and a DAG block chain is output subsequent to inputting of the data of the time slice. Each DAG block chain is independent but in a chronological order. The data of the next time slice are input only after inputting of the data of a previous time slice is completed and credit incentives and penalties for all participating nodes are imparted. During data simulation, the data generated from each node are taken as a transaction, a node which generates data is referred as an initiating node of the transaction, and a node which receives data is referred as a receiving node of the transaction. A transaction process is that, prior to connecting to the DAG block chain, a new transaction is required to verify two transactions having been connected to the chain, and verification of the transaction follows an established transaction verification rule.

Step 3: transaction path backtracing. When a transaction path is backtraced, a credit penalty is imparted to participating nodes of a transaction that goes against a data view of a terminated transaction, among all the transactions that are backtraced, and a credit incentive is imparted to the remaining nodes, in a case where the terminated transaction is verified as a safe transaction, and a credit incentive is imparted to a transactor of a transaction that goes against a data view of a terminated transaction, among all the transactions that are backtraced, and a credit penalty is imparted to the remaining nodes, in a case where the terminated transaction is verified as a danger transaction.

Step 4: assessment result outputting. Subsequent to the end of the in-the-loop test, credit account balance of each node is output, and is used to characterize a hazard of a corresponding node, the lower the credit account balance is, the higher the hazard of the node is.

At the node initialization stage of the step 1 of the disclosure, it needs to create a node based on the hardware in the in-the-loop test firstly, and then the node is assigned with a credit account. Attributes of the node may be set upon creation of the node. The attributes of the node may include a node number (Pid), a node name (Pname), a node type (Ptype), a node public key (Ppk), a node private key (Psk), among others. The Ptype may be indicative of the light node, or the full node. The Psk belongs to a private attribute, and is visible only to the node itself. Prior to generating nodes for the hardware in the in-the-loop test, a specific virtual full node is needed to be generated. Here, the specific full node acts as a "manager", and is assumed to be fully trustable. The "manager" node is of the same attributes as the light node and the full node, but has no credit account.

In assigning the credit account of the step 1 of the disclosure, each node is assigned with a corresponding credit account that is representative of a credibility of the nodes, except for the specific full node. The credit account is changed each time when the transaction path is backtraced, and dynamic information on the change is recorded. The account is composed of an account header and an account content. The account header is used for storing basic information of the account, and the account content is used for storing the dynamic information on the account balance change. The basic attributes of the account header may include an account id (Aid), a corresponding node id (Pid), a current balance (Abalance), among others. The account content may include a transaction id (Tid), a transaction type (Ttype), the number of verifications in the transaction (Tverify), transaction time (Ttime) and a value of credit coins of the transaction (Tvalue). The transaction type is used to indicative whether the transaction is a credit incentive or a credit penalty. The value of the credit coins of the transaction (Tvalue) is positive when the transaction is the credit incentive, and when the transaction is the credit penalty, the value of the credit coins of the transaction (Tvalue) is negative.

In the step 2 of the disclosure, the process of the transaction may involve creating the data transmission in the in-the-loop test as a transaction (TX) in real time. A data structure of the TX possesses mainly six attributes, including an id of the transaction (Tid), hash values of first two transactions verified by the transaction (Prehash), the data of the transaction (Tdata), the number of times of the transaction being verified by subsequent transactions (Tverify), and a hash value of the transaction (Thash). The data used in the transaction process is encrypted by using a symmetric key, the "manager" is responsible for distributing and managing the key. After the key is distributed, the transaction can be initiated, and the two transactions having been connected to the DAG chain are required to be verified by the initiated transaction. This process may be referred as transaction verification. The transaction may be written into the DAG chain after the transaction verification is successful. In response to the nodes of a last transaction that are not verified by any other transactions, the transaction path is backtraced, and the credit incentives and the credit penalties for the nodes are imparted according to a credit assessment rule.

In transaction verification process of the step 2 of the disclosure, the TX is preconnected to the DAG chain after being created during the transaction verification, and at this time, the TX has not verified designated parent transactions on the chain. Such TX is referred as a Tip. After the TX is preconnected to the DAG chain, two designated parent transactions are selected for verification, the TX is formally connected to the DAG chain upon successful verification, waiting for subsequent child transactions to access and verify the TX. The hash values (Prehashs) of the first two transactions verified by the transaction are calculated from hash values of the two parent transactions of the transaction. During the transaction verification, the hash values and signatures of the parent transactions are verified, and subsequent to the verification, the combination of the hash values of the two parent transactions that pass the verification are calculated and stored as a Prehash;

An equation for calculating the Prehash is $$\text{Prehash} = \text{Hash}(\text{Thash}_1 \| \text{Thash}_2);$$

An equation for calculating the Thash is $\text{Thash} = \text{Hash}(\text{TX})$ and the $\text{Thash}_1$ and the $\text{Thash}_2$ are the hash values of the two parent transactions, respectively.

In the step 2 of the disclosure, the transaction verification rule includes, for selection of a verification object: rule 1, selecting an initiating node that verifies a new transaction as the transaction acting as the receiving nodes; rule 2, backtracing according to the rule 1 by taking the transaction found by the rule 1 as a start point when there are less than two transactions that meet the rule 1, and when two parent transactions are obtained by backtracing, prioritizing direct parent transactions of a transaction at the start point; and rule 3, prioritizing the transactions that are less verified, prioritizing the transaction initiated by the transaction initiating nodes with lower credit when the transactions meet a preceding rule and are verified the same times, and prioritizing the transaction whose transaction initiation time is earlier when the credits of the transaction initiation nodes of multiple transactions are the same. Verifying two transactions as the parent transactions of the new transaction when exactly two transactions meet the rule 1, and when only one transaction meets the rule 1, backtracing the transactions based on the principle of the rule 2 by taking the one transaction as a start point, and selecting, among the transactions obtained during backtracing, a transaction of meeting the requirements according to the principle of the rule 3 to form two parent transactions together with the one transaction.

In the step 3 of the disclosure involving path backtracing, during backtracing of the path, the property of the terminated transaction is firstly ascertained to determine whether the terminated transaction is a safe transaction or a hazard transaction, and secondly, it is verified whether a data direction of each transaction is consistent with that of the terminated transaction, and credit incentives or credit penalties are imparted to the nodes corresponding to the transaction according to the principle of the credit assessment.

In the step 4 of the disclosure involving the credit assessment result, the credit assessment result is a quantitative result for the assessment of the SOTIF, and a credit balance of a final node is an assessment result. A credit assessment algorithm may be used to implement the credit incentives and penalties for the nodes, and is designed, when the terminated transaction is safe transaction, to impart credit penalty to transaction nodes whose data are inconsistent with those of the terminated transaction during backtracing of the path, and to impart credit incentive to the rest of the nodes, and when the terminated transaction is a danger transaction or a hazard transaction, to impart credit incentive to the transaction nodes whose data are inconsistent with those of the terminated transaction, and to impart credit penalty to the rest of the nodes. There are two requirements in terms of credit inventive or credit penalty: firstly, the credit incentive is imparted at a time, an effect of which is not strengthened or weakened with the lapse of time, but is gradually weakened with the credit penalty, until the effect of the credit incentives is zeroed; secondly, the effect of the credit penalty is gradually reduced as the number of the transaction paths is increased, and is ineliminable.

An equation for calculating the credit balance is $C_i = C_i^P + C_i^N$, where $C_i$ represents the credit account balance of a node i, $C_i^P$ represents the credit incentive imparted to the node i, and $C_i^N$ represents the credit penalty imparted to the node i.

An equation for calculating the credit incentive is $$C_i^P = \frac{\sum_{k=1}^{n_P} v_k}{n_P},$$

where $n_P$ represents a number of the transaction paths that the node i participates in and that make a positive contribution, among the transaction paths; $v_k$ represents a number of times the node i is verified on a k-th transaction path; the more times the node i is verified, the higher credibility of the node i, and the more credit incentives is imparted. An accumulation of the credit incentive is formulated as an arithmetic average of the number of the transaction paths that the nodes participate in and that make a positive contribution.

An equation for calculating the credit penalty is $$C_i^N = -\frac{\sum_{k=1}^{n_N} v_k}{n_N - k + 1},$$

where $n_N$ represents a number of the transaction paths that the node i participates in and that make a negative contribution, among the transaction paths; $v_k$ represents a number of times the node i is verified on the k-th transaction path. The more times the node i is verified, the deeper the influence of negative effect of the node i in the transaction path, and the stricter the credit penalty is imparted. The degree of the credit penalties in the preceding transaction paths is gradually reduced as the number of the transaction paths is increased.

A device is further proposed by the disclosure, including: a memory and a processor; a computer program is stored in the memory, and, when executed by the processor, is adapted to perform the method described above.

A computer-readable storage medium is further proposed by the disclosure, having stored thereon a computer program, which, when executed by a processor, is adapted to perform the method described above.

The beneficial effects of the disclosure are as follows. According to the disclosure the DAG block chain technology is exploited and fused with the intended functionality system to realize the safety assessment of intended functionality. The disclosure may perform objective assessment on the SOTIF based on data. Traditional methods for assessing safety of functionality, such as the STPA+ASIL method, adopt expert scoring, which are highly subjective. The assessment method according to the disclosure is combined with the in-the-loop test to analyze the current test data without having to rely on a large amount of traditional experience to make judgments. Further, traditional assessment methods are mostly based on existing dangerous event databases, which cannot meet unknown requirements of the SOTIF. According to the disclosure, the result of the credit assessment for the nodes can be taken as the result of the safety assessment. In this way, each of hardware or components is analyzed in terms of the safety and reliability, and therefore the result of the assessment is relatively complete.

DETAILED DESCRIPTION OF THE EMBODIMENTS

The disclosure will be further described in detail in conjunction with the following specific embodiments and drawings. The processes, conditions, and experimental methods for implementing the disclosure, except for the contents specifically mentioned below, are all common knowledge and common sense in the art, and the disclosure has no special limitations.

To be specific, the method for assessing the harm of intended functionality of autonomous driving based on DAG block chain proposed by the disclosure may include the following four steps. Step 1: data initialization. At the data initialization stage, nodes are firstly initialized to generate respective full nodes or light nodes and a specific full node manager for all hardware participating in an in-the-loop test, to assign a corresponding public-private key pair, and to create a credit account for all the full nodes and the light nodes except the manager node and preset a credit coin of equal amount. Step 2: data simulation. At the data simulation stage, test data is needed to be sliced in units of test scenes firstly, and each time slice corresponds to a test scene. Data of the slice are input sequentially in chronological order, and a DAG block chain is output subsequent to inputting of the data of the time slice. Each DAG block chain is independent but in a chronological order. The data of the next time slice are input only after inputting of the data of a previous time slice is completed and credit incentives and penalties for all participating nodes are imparted. During data simulation, the data generated from each node are taken as a transaction, a node which generates data is referred as an initiating node of the transaction, and a node which receives data is referred as a receiving node of the transaction. A transaction process is that, prior to connecting to the DAG block chain, a new transaction is required to verify two transactions having been connected to the chain, and verification of the transaction follows an established transaction verification rule. Step 3: transaction path backtracing. When a transaction path is backtraced, a credit penalty is imparted to participating nodes of a transaction that goes against a data view of a terminated transaction, among all the transactions that are backtraced, and a credit incentive is imparted to the remaining nodes, in a case where the terminated transaction is verified as a safe transaction, and a credit incentive is imparted to a transactor of a transaction that goes against a data view of a terminated transaction, among all the transactions that are backtraced, and a credit penalty is imparted to the remaining nodes, in a case where the terminated transaction is verified as a danger transaction. Step 4: assessment result outputting.

Subsequent to the end of the in-the-loop test, credit account balance of each node is output, and is used to characterize a hazard of a corresponding node, the lower the credit account balance is, the higher the hazard of the node is.

At the node initialization stage of the step 1, it needs to create a node based on the hardware in the in-the-loop test firstly, and then the node is assigned with a credit account. Attributes of the node may be set upon creation of the node. The attributes of the node may include a node number (Pid), a node name (Pname), a node type (Ptype), a node public key (Ppk), a node private key (Psk), among others. The Ptype may be indicative of the light node, or the full node. The Psk belongs to a private attribute, and is visible only to the node itself. Prior to generating nodes for the hardware in the in-the-loop test, a specific virtual full node is needed to be generated. Here, the specific full node acts as a "manager", and is assumed to be fully trustable. The "manager" node is of the same attributes as the light node and the full node, but has no credit account.

In assigning the credit account of the step 1, each node is assigned with a corresponding credit account that is representative of a credibility of the nodes, except for the specific full node. The credit account is changed each time when the transaction path is backtraced, and dynamic information on the change is recorded. The account is composed of an account header and an account content. The account header is used for storing basic information of the account, and the account content is used for storing the dynamic information on the account balance change. The basic attributes of the account header may include an account id (Aid), a corresponding node id (Pid), a current balance (Abalance), among others. The account content may include a transaction id (Tid), a transaction type (Ttype), the number of verifications in the transaction (Tverify), transaction time (Ttime) and a value of credit coins of the transaction (Tvalue). The transaction type is used to indicate whether the transaction is a credit incentive or a credit penalty. The value of the credit coins of the transaction (Tvalue) is positive when the transaction is the credit incentive, and when the transaction is the credit penalty, the value of the credit coins of the transaction (Tvalue) is negative.

In the step 2, the process of the transaction may involve creating the data transmission in the in-the-loop test as a transaction (TX) in real time. A data structure of the TX possesses mainly six attributes, including an id of the transaction (Tid), hash values of first two transactions verified by the transaction (Prehash), the data of the transaction (Tdata), the number of times of the transaction being verified by subsequent transactions (Tverify), and a hash value of the transaction (Thash). The data used in the transaction process is encrypted by using a symmetric key, the "manager" is responsible for distributing and managing the key. After the key is distributed, the transaction can be initiated, and the two transactions having been connected to the DAG chain are required to be verified by the initiated transaction. This process may be referred as transaction verification. The transaction may be written into the DAG chain after the transaction verification is successful. In response to the nodes of a last transaction that are not verified by any other transactions, the transaction path is backtraced, and the credit incentives and the credit penalties for the nodes are imparted according to a credit assessment rule.

In transaction verification process of the step 2, the TX is preconnected to the DAG chain after being created during the transaction verification, and at this time, the TX has not verified designated parent transactions on the chain. Such TX is referred as a Tip. Once the TX is preconnected to the DAG chain, two designated parent transactions are selected for verification, the TX is formally connected to the DAG chain upon successful verification, waiting for subsequent child transactions to access and verify the TX. The hash values (Prehashs) of the first two transactions verified by the transaction are calculated from hash values of the two parent transactions of the transaction. During the transaction verification, the hash values and signatures of the parent transactions are verified, and subsequent to the verification, the combination of the hash values of the two parent transactions that pass the verification are calculated and stored as a Prehash; an equation for calculating the Prehash is $Prehash=Hash(Thash_1\|Thash_2)$; an equation for calculating the Thash is $Thash=Hash(TX)$; the $Thash_1$ and the $Thash_2$ are the hash values of the two parent transactions, respectively.

In the step 2, the transaction verification rule may include, for selection of a verification object: rule 1, selecting an initiating node that verifies a new transaction as the transaction acting as the receiving nodes; rule 2, backtracing according to the rule 1 by taking the transaction found by the rule 1 as a start point when there are less than two transactions that meet the rule 1, and when two parent transactions are obtained by backtracing, prioritizing direct parent transactions of a transaction at the start point; and rule 3, prioritizing the transactions that are less verified, prioritizing the transaction initiated by the transaction initiating nodes with lower credit when the transactions meet a preceding rule and are verified the same times, and prioritizing the transaction whose transaction initiation time is earlier when the credits of the transaction initiation nodes of multiple transactions are the same. Two transactions are verified as the parent transactions of the new transaction when exactly two transactions meet the rule 1, and when only one transaction meets the rule 1, the transactions are backtraced based on the principle of the rule 2 by taking the one transaction as a start point. Further, among the transactions obtained during backtracing, a transaction of meeting the requirements is selected according to the principle of the rule 3 to form two parent transactions together with the one transaction.

In the step 3 involving path backtracing, during backtracing of the path, the property of the terminated transaction is firstly ascertained to determine whether the terminated transaction is a safe transaction or a hazard transaction, and secondly, it is verified whether a data direction of each transaction is consistent with that of the terminated transaction, and credit incentives or credit penalties are imparted to the nodes corresponding to the transaction according to the principle of the credit assessment.

In the step 4 of the disclosure involving the credit assessment result, the credit assessment result is a quantitative result for the assessment of the SOTIF, and a credit balance of a final node is an assessment result. A credit assessment algorithm may be used to implement the credit incentives and penalties for the nodes, and is designed, when the terminated transaction is safe transaction, to impart credit penalty to transaction nodes whose data are inconsistent with those of the terminated transaction during backtracing of the path, and to impart credit incentive to the rest of the nodes, and when the terminated transaction is a danger transaction or a hazard transaction, to impart credit incentive to the transaction nodes whose data are inconsistent with those of the terminated transaction, and to impart credit penalty to the rest of the nodes. There are two requirements in terms of credit inventive or credit penalty: firstly, the credit incentive is imparted at a time, an effect of which is not strengthened or weakened with the lapse of time, but is gradually weakened with the credit penalty, until the effect of the credit incentives is zeroed; secondly, the effect of the credit penalty is gradually reduced as the number of the transaction paths is increased, and is ineliminable; an equation for calculating the credit balance is $C_i=C_i^P+C_i^N$, where $C_i$ represents the credit account balance of a node i, $C_i^P$ represents the credit incentive imparted to the node i, and $C_i^N$ represents the credit penalty imparted to the node i; an equation for calculating the credit incentive is $$C_i^P = \frac{\sum_{k=1}^{n_P} v_k}{n_P},$$

where $n_P$ represents a number of the transaction paths that the node i participates in and that make a positive contribution, among the transaction paths; $v_k$ represents a number of times the node i is verified on a k-th transaction path; the more times the node i is verified, the higher credibility of the node i, and the more credit incentives is imparted. An accumulation of the credit incentive is formulated as an arithmetic average of the number of the transaction paths that the nodes participate in and that make a positive contribution. An equation for calculating the credit penalty is $$C_i^N = -\frac{\sum_{k=1}^{n_N} v_k}{n_N - k + 1},$$

where $n_N$ represents a number of the transaction paths that the node i participates in and that make a negative contribution, among the transaction paths; and $v_k$ represents a number of times the node i is verified on the k-th transaction path. The more times the node i is verified, the deeper the influence of negative effect of the node i in the transaction path, and the stricter the credit penalty is imparted. The degree of the credit penalties in the preceding transaction paths is gradually reduced as the number of the transaction paths is increased.

EMBODIMENTS

Figure 1:
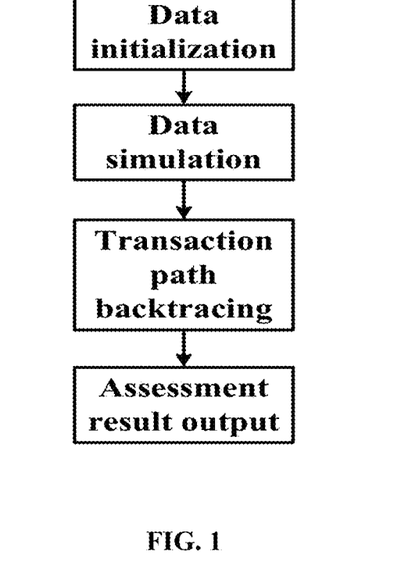
FIG. 1 is a flow chart of a safety assessment process according to the disclosure.

As shown in FIG. 1, a method for assessing SOTIF of autonomous driving based on block chain may include the following four steps. Step 1: data initialization. At the data initialization stage, nodes are firstly initialized to generate respective full nodes or light nodes and a specific full node manager for all hardware participating in an in-the-loop test, to assign a corresponding public-private key pair, and to create a credit account for all the full nodes and the light nodes except the manager node and preset a credit coin of equal amount. Step 2: data simulation. At the data simulation stage, test data is needed to be sliced in units of test scenes firstly, and each time slice corresponds to a test scene. Data of the slice are input sequentially in chronological order, and a DAG block chain is output subsequent to inputting of the data of the time slice. Each DAG block chain is independent but in a chronological order. The data of the next time slice are input only after inputting of the data of a previous time slice is completed and credit incentives and penalties for all participating nodes are imparted. During data simulation, the data generated from each node are taken as a transaction, a node which generates data is referred as an initiating node of the transaction, and a node which receives data is referred as a receiving node of the transaction. A transaction process is that, prior to connecting to the DAG block chain, a new transaction is required to verify two transactions having been connected to the chain, and verification of the transaction follows an established transaction verification rule. Step 3: transaction path backtracing. When a transaction path is backtraced, a credit penalty is imparted to participating nodes of a transaction that goes against a data view of a terminated transaction, among all the transactions that are backtraced, and a credit incentive is imparted to the remaining nodes, in a case where the terminated transaction is verified as a safe transaction, and a credit incentive is imparted to a transactor of a transaction that goes against a data view of a terminated transaction, among all the transactions that are backtraced, and a credit penalty is imparted to the remaining nodes, in a case where the terminated transaction is verified as a danger transaction. Step 4: assessment result outputting. Subsequent to the end of the in-the-loop test, credit account balance of each node is output, and is used to characterize a hazard of a corresponding node. The lower the credit account balance is, the higher the hazard of the node is.

Figure 2:
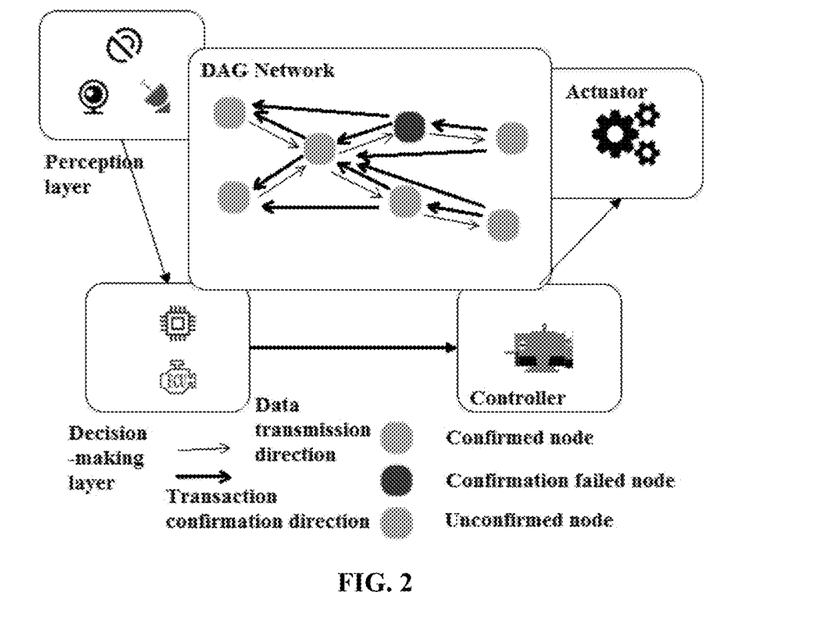
FIG. 2 is a system structural diagram formed by modeling the SOTIF system based on DAG block chain according to the disclosure.

As shown in FIG. 1, at the node initialization stage of the step 1, it needs to create a node based on the hardware in the in-the-loop test firstly, and then the node is assigned with a credit account. Attributes of the node may be set upon creation of the node. The attributes of the node may include a node number (Pid), a node name (Pname), a node type (Ptype), a node public key (Ppk), a node private key (Psk), among others. The Ptype may be indicative of the light node, or the full node. The Psk belongs to a private attribute, and is visible only to the node itself. Prior to generating nodes for the hardware in the in-the-loop test, a specific virtual full node is needed to be generated. Here, the specific full node acts as a "manager", and is assumed to be fully trustable. The "manager" node is of the same attributes as the light node and the full node, but has no credit account. A structural diagram of an autonomous driving intended system constructed according to the contents of the disclosure is illustrated in FIG. 2, letting LPs represents a perception layer node, $LP_C$ represents a control and execution layer node, and $FP_D$ represents a decision-making layer node. Every time the perception layer node reports and sends data acquired by hardware such as sensors, it will be regarded as a genesis transaction TXF, a transaction unit constituted by the genesis transaction does not have any parent transaction, and must be a transmission of unanalyzed data acquired by sensors, positioning systems, etc.

As shown in FIG. 1, in assigning the credit account of the step 1, each node is assigned with a corresponding credit account that is representative of a credibility of the nodes, except for the specific full node. The credit account is changed each time when the transaction path is backtraced, and dynamic information on the change is recorded. The account is composed of an account header and an account content. The account header is used for storing basic information of the account, and the account content is used for storing the dynamic information on the account balance change. The basic attributes of the account header may include an account id (Aid), a corresponding node id (Pid), a current balance (Abalance), among others. The account content may include a transaction id (Tid), a transaction type (Ttype), the number of verifications in the transaction (Tverify), transaction time (Ttime) and a value of credit coins of the transaction (Tvalue). The transaction type is used to indicate whether the transaction is a credit incentive or a credit penalty. The value of the credit coins of the transaction (Tvalue) is positive when the transaction is the credit incentive, and when the transaction is the credit penalty, the value of the credit coins of the transaction (Tvalue) is negative.

As shown in FIG. 1, in the step 2, the process of the transaction involves creating the data transmission in the in-the-loop test as a transaction (TX) in real time. A data structure of the TX possesses mainly six attributes, including an id of the transaction (Tid), hash values of first two transactions verified by the transaction (Prehash), the data of the transaction (Tdata), the number of times of the transaction being verified by subsequent transactions (Tverify), and a hash value of the transaction (Thash). The data used in the transaction process is encrypted by using a symmetric key, the "manager" is responsible for distributing and managing the key. After the key is distributed, the transaction can be initiated, and the two transactions having been connected to the DAG chain are required to be verified by the initiated transaction. This process may be referred as transaction verification. The transaction may be written into the DAG chain after the transaction verification is successful. In response to the nodes of a last transaction that are not verified by any other transactions, the transaction path is backtraced, and the credit incentives and the credit penalties for the nodes are imparted according to a credit assessment rule.

As shown in FIG. 1, in transaction verification process of the step 2, the TX is preconnected to the DAG chain after being created during the transaction verification, and at this time, the TX has not verified designated parent transactions on the chain. Such TX is referred as a Tip. After the TX is preconnected to the DAG chain, two designated parent transactions are selected for verification, the TX is formally connected to the DAG chain upon successful verification, waiting for subsequent child transactions to access and verify the TX. The hash values (Prehashs) of the first two transactions verified by the transaction are calculated from hash values of the two parent transactions of the transaction. During the transaction verification, the hash values and signatures of the parent transactions are verified, and subsequent to the verification, the combination of the hash values of the two parent transactions that pass the verification are calculated and stored as a Prehash; an equation for calculating the Prehash is Prehash=Hash(Thash$_1$||Thash$_2$); an equation for calculating the Thash is Thash=Hash(TX); the Thash$_1$ and the Thash$_2$ are the hash values of the two parent transactions, respectively.

Figure 3:
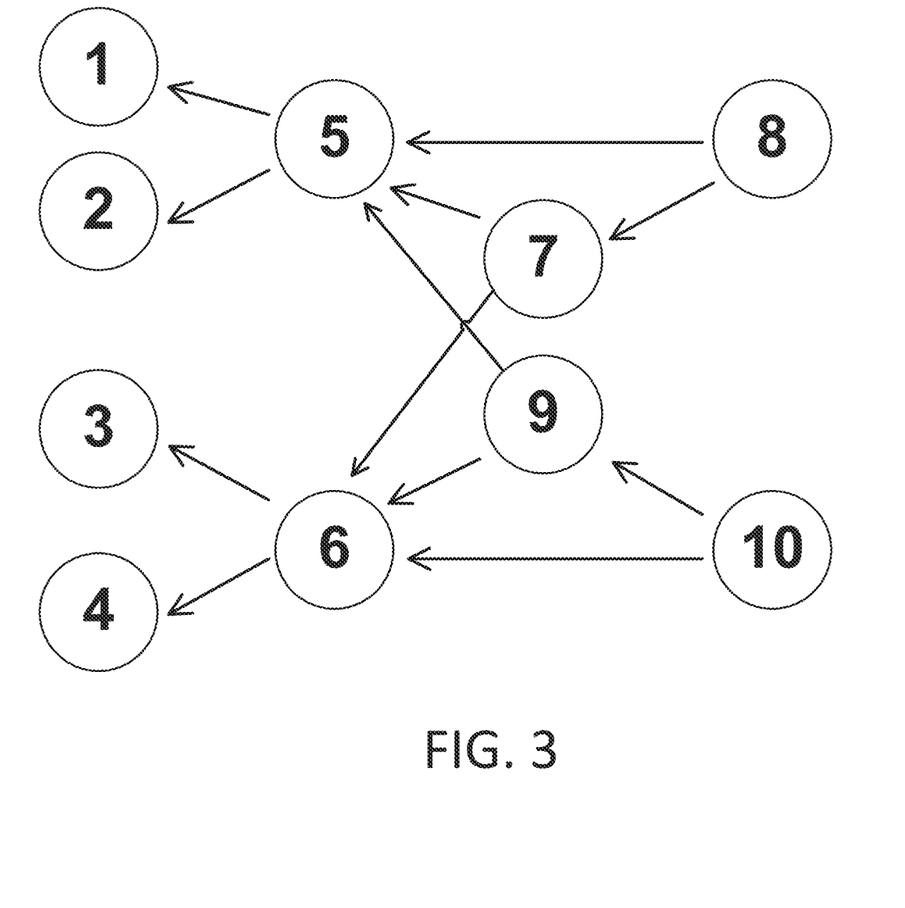
FIG. 3 is a diagram of an example of transaction verification according to the disclosure.

As shown in FIG. 1, in the step 2, the transaction verification rule includes, for selection of a verification object: rule 1, selecting an initiating node that verifies a new transaction as the transaction acting as the receiving nodes; rule 2, backtracing according to the rule 1 by taking the transaction found by the rule 1 as a start point when there are less than two transactions that meet the rule 1, and when two parent transactions are obtained by backtracing, prioritizing direct parent transactions of a transaction at the start point; and rule 3, prioritizing the transactions that are less verified, prioritizing the transaction initiated by the transaction initiating nodes with lower credit when the transactions meet a preceding rule and are verified the same times, and prioritizing the transaction whose transaction initiation time is earlier when the credits of the transaction initiation nodes of multiple transactions are the same. Verifying two transactions as the parent transactions of the new transaction when exactly two transactions meet the rule 1, and when only one transaction meets the rule 1, backtracing the transactions based on the principle of the rule 2 by taking the one transaction as a start point, and selecting, among the transactions obtained during backtracing, a transaction of meeting the requirements according to the principle of the rule 3 to form two parent transactions together with the one transaction. As shown in FIG. 3, the direction along which transaction verification proceeds is indicated by a green arrow. Assume that FIG. 3 illustrates a scenario of Autonomous Emergency Brake (AEB) system, where a transaction 1 and a transaction 2 are respectively initiated by a node Front-Camera-R (an in-vehicle right-front camera) and a node Front-Camera-L (an in-vehicle left-front camera), and the screens showing captured image of real-time road conditions are transmitted to a node ECU-1 (a processor tasked with processing of the image data) through these two transactions. A transaction 3 and a transaction 4 are respectively transactions initiated by a node Front-Lidar-R (an in-vehicle right-front lidar) and a node Front-Lidar-L (an in-vehicle left-front lidar), and the detected lidar information on the real-time road conditions is transmitted to a node ECU-2 (tasked with processing lidar data) through these two transactions. A transaction 5 and a transaction 6 are initiated by the node ECU-1 and the node ECU-2, respectively, and the processed data are transmitted to a node ECU-3 (tasked with data judgment and driving decision-making) through these two transactions. A transaction 7 is initiated by the node ECU-3, and a braking decision is transmitted to a node Brake (a brake) through this transaction. A transaction 8 is initiated by the node Brake, the objective of this transaction is to perform a braking operation, and a receiving node of this transaction is a virtual node End of the system, which indicates the end of this scenario. In this regard, the transaction 8 is also referred as a termination transaction. A transaction 9 is initiated by the node ECU-3, and warning information is transmitted to a node Board (a dash board). A transaction 10 is initiated by the node Board, the objective is to display the warning information to remind drivers and passengers to pay attention, and a receiving node of the transaction 10 is also the node End. In this regard, the transaction 10 is also referred as the termination transaction. As shown in FIG. 3, assuming that credits of all nodes in this scenario are the same, the transaction 7 and the transaction 9 may find two transactions (the transaction 5 and the transaction 6) that meet the rules for verification according to the transaction verification rule 1. The transaction 8 may only find one transaction that meets the rules (the transaction 7) according to the rule 1, then find the transactions (the transaction 5 and the transaction 6) that meet the rules by backtracing according to the rule 2, and then find the transaction (the transaction 5) with earlier initiation time according to the rule 3. Consequently, the transaction 8 selects the transaction 7 and the transaction 5 for verification. The transaction 10 may also find only one transaction (the transaction 7) that meets the rules according to the rule 1, then find the transactions (the transaction 5 and the transaction 6) that meet the rules according to the rule 2, and then find the transaction (the transaction 6) with less verification times according to the rule 3. Consequently, the transaction 10 selects the transaction 7 and the transaction 6 for verification.

As shown in FIG. 1, in the step 3 involving path backtracing, during backtracing of the path, the property of the terminated transaction is firstly ascertained to determine whether the terminated transaction is a safe transaction or a hazard transaction, and secondly, it is verified whether a data direction of each transaction is consistent with that of the terminated transaction, and credit incentives or credit penalties are imparted to the nodes corresponding to the transaction according to the principle of the credit assessment.

As shown in FIG. 1, in the step 4 of the disclosure involving the credit assessment result, the credit assessment result is a quantitative result for the assessment of the SOTIF, and a credit balance of a final node is an assessment result. A credit assessment algorithm may be used to implement the credit incentives and penalties for the nodes, and is designed, when the terminated transaction is safe transaction, to impart credit penalty to transaction nodes whose data are inconsistent with those of the terminated transaction during backtracing of the path, and to impart credit incentive to the rest of the nodes, and when the terminated transaction is a danger transaction or a hazard transaction, to impart credit incentive to the transaction nodes whose data are inconsistent with those of the terminated transaction, and to impart credit penalty to the rest of the nodes. There are two requirements in terms of credit inventive or credit penalty: firstly, the credit incentive is imparted at a time, an effect of which is not strengthened or weakened with the lapse of time, but is gradually weakened with the credit penalty, until the effect of the credit incentives is zeroed; secondly, the effect of the credit penalty is gradually reduced as the number of the transaction paths is increased, and is inelim­inable; an equation for calculating the credit balance is $C_i = C_i^P + C_i^N$, where $C_i$ represents the credit account balance of a node i, $C_i^P$ represents the credit incentive imparted to the node i, and $C_i^N$ represents the credit penalty imparted to the node i; an equation for calculating the credit incentive is $$C_i^P = \frac{\sum_{k=1}^{n_P} v_k}{n_P},$$

where $n_P$ represents a number of the transaction paths that the node i participates in and that make a positive contribution, among the transaction paths; $v_k$ represents a number of times the node i is verified on a k-th transaction path; the more times the node i is verified, the higher credibility of the node i, and the more credit incentives is imparted. An accumulation of the credit incentive is formulated as an arithmetic average of the number of the transaction paths that the nodes participate in and that make a positive contribution. An equation for calculating the credit penalty is $$C_i^N = -\frac{\sum_{k=1}^{n_N} v_k}{n_N - k + 1},$$

where $n_N$ represents a number of the transaction paths that the node i participates in and that make a negative contribution, among the transaction paths; $v_k$ represents a number of times the node i is verified on the k-th transaction path. The more times the node i is verified, the deeper the influence of negative effect of the node i in the transaction path, and the stricter the credit penalty is imparted. The degree of the credit penalties in the preceding transaction paths is gradually reduced as the number of the transaction paths is increased.

A device also proposed by the disclosure, including: a memory and a processor, in which a computer program is stored in the memory, and, when executed by the processor, is adapted to perform the method described above.

A computer-readable storage medium is further proposed by the disclosure, having stored thereon a computer program, which, when executed by a processor, is adapted to perform the method described above.

The protection content of the disclosure is not limited to the above embodiments. It is contemplated that changes and advantages that can be conceived by those skilled in the art are all included in the disclosure without departing from the spirit and scope of concept of the disclosure, and the protection scope is defined by the appended claims.

What is claimed is:

1. A method for assessing Safety Of The Intended Functionality (SOTIF) of autonomous driving based on DAG block chain, comprising the following steps:

step 1: initializing nodes to generate respective full nodes, light nodes and a specific full node manager for all hardware participating in an in-the-loop test, to assign a corresponding public-private key pair, and to create a credit account for all of the full nodes and the light nodes except the manager node and preset a credit coin of equal amount;

step 2: slicing test data in units of test scenes, each time slice being corresponding to a test scene; inputting data of the slice sequentially in chronological order, and outputting a DAG block chain subsequent to inputting of the data of the time slice, each DAG block chain being independent and being in a chronological order, the data of the next time slice being input only after inputting of the data of a previous time slice is completed and credit incentives and penalties for all participating nodes are imparted; during data simulation, taking the data generated from each node as a transaction, a node which generates data being referred as an initiating node of the transaction, a node which receives data being referred as a receiving node of the transaction; a transaction process being that, prior to connecting to the DAG block chain, a new transaction is required to verify two transactions having been connected to the chain, and verification of the transaction following an established transaction verification rule;

step 3: when a transaction path is backtraced, a credit penalty is imparted to participating nodes of a transaction that goes against a data view of a terminated transaction, among all the transactions that are backtraced, and a credit incentive is imparted to the remaining nodes, in a case where the terminated transaction is verified as a safe transaction, and a credit incentive is imparted to a transactor of a transaction that goes against a data view of a terminated transaction, among all the transactions that are backtraced, and a credit penalty is imparted to the remaining nodes, in a case where the terminated transaction is verified as a danger transaction; and step 4: subsequent to the end of the in-the-loop test, outputting credit account balance of each node, and characterizing a hazard of a corresponding node by means of the credit account balance, the lower the credit account balance, the higher the hazard of the node.

2. The method for assessing SOTIF of autonomous driving based on DAG block chain according to claim 1, wherein in the step 1, a node is created based on the hardware in the in-the-loop test firstly, and then the node is assigned with a credit account; attributes of the node are set upon creation of the node, the attributes of the node comprise a node number, a node name, a node type, a node public key, and a node private key; the type of the node is the light node or the full node; the node private key belongs to a private attribute, and is visible only to the node itself; prior to generating nodes for the hardware in the in-the-loop test, a specific virtual full node is generated to act as a manager, and is assumed to be a fully trusted manager node, which is of the same attributes as the light node and the full node, but without the credit account.

3. The method for assessing SOTIF of autonomous driving based on DAG block chain according to claim 2, wherein in the step 1, each node is assigned with a corresponding credit account representative of a credibility of the nodes except for the specific full node, in assigning the credit account; the credit account is changed each time when the transaction path is backtraced, and dynamic information on the change is recorded; the account is composed of an account header and an account content; the account header is used for storing basic information of the account, the account content is used for storing the dynamic information on the account balance change; the basic attributes of the account header comprise an account id, a corresponding node id, and a current balance; the account content comprises a transaction id, a transaction type, number of verifications in the transaction, transaction time and a value of credit coins of the transaction; wherein the transaction type is used for indicating whether the transaction is a credit incentive or a credit penalty, the value of the credit coins of the transaction is positive when the transaction is the credit incentive, and when the transaction is the credit penalty, the value of the credit coins of the transaction is negative.

4. The method for assessing SOTIF of autonomous driving based on DAG block chain according to claim 1, wherein in the step 2, the process of the transaction comprises the data transmission in the in-the-loop test being created as a transaction in real time; a data structure of TX possesses mainly six attributes, including an id of the transaction, a hash value of first two transactions verified by the transaction, the data of the transaction, number of times of the transaction being verified by subsequent transactions, and a hash value of the transaction; the data in the transaction process is encrypted by using a symmetric key, the manager is responsible for distributing and managing the key; after the key is distributed, the transaction is initiated, and the two transactions having been connected to the DAG chain are verified by the initiated transaction, which is a process of transaction verification; the transaction is written into the DAG chain after the transaction verification is successful; in response to the nodes of a last transaction that are not verified by any other transactions, the transaction path is backtraced, and the credit incentives and the credit penalties for the nodes are imparted according to a credit assessment rule.

5. The method for assessing SOTIF of autonomous driving based on DAG block chain according to claim 1, wherein in the step 2, the TX is preconnected to the DAG chain after being created during the transaction verification, and at this time, the TX has not verified designated parent transactions on the chain, such TX is referred as a Tip; after the TX is preconnected to the DAG chain, two designated parent transactions are selected for verification, the TX is formally connected to the DAG chain upon successful verification, waiting for subsequent child transactions to access and verify the TX; the hash values of the first two transactions verified by the transaction are calculated from hash values of the two parent transactions of the transaction; during the transaction verification, the hash values and signatures of the parent transactions are verified, and subsequent to the verification, the combination of the hash values of the two parent transactions that pass the verification are calculated and stored as a Prehash;

an equation for calculating the Prehash is $$\text{Prehash} = \text{Hash}(\text{Thash}_1 \| \text{Thash}_2);$$

an equation for calculating the Thash is $\text{Thash} = \text{Hash}(\text{TX})$; and the $\text{Thash}_1$ and the $\text{Thash}_2$ are the hash values of the two parent transactions, respectively.

6. The method for assessing SOTIF of autonomous driving based on DAG block chain according to claim 1, wherein in the step 2, the transaction verification rule comprises, for selection of a verification object: rule 1, selecting an initiating node that verifies a new transaction as the transaction acting as the receiving nodes; rule 2, backtracing according to the rule 1 by taking the transaction found by the rule 1 as a start point when there are less than two transactions that meet the rule 1, and when two parent transactions are obtained by backtracing, prioritizing direct parent transactions of a transaction at the start point; and rule 3, prioritizing the transactions that are less verified, prioritizing the transaction initiated by the transaction initiating nodes with lower credit when the transactions meet a preceding rule and are verified the same times, and prioritizing the transaction whose transaction initiation time is earlier when the credits of the transaction initiation nodes of multiple transactions are the same; verifying two transactions as the parent transactions of the new transaction when exactly two transactions meet the rule 1, and when only one transaction meets the rule 1, backtracing the transactions based on the principle of the rule 2 by taking the one transaction as a start point, and selecting, among the transactions obtained during backtracing, a transaction of meeting the requirements according to the principle of the rule 3 to form two parent transactions together with the one transaction.

7. The method for assessing SOTIF of autonomous driving based on DAG block chain according to claim 1, wherein in the step 3 involving path backtracing, during backtracing of the path, the property of the terminated transaction is firstly ascertained to determine whether the terminated transaction is a safe transaction or a hazard transaction, and secondly, it is verified whether a data direction of each transaction is consistent with that of the terminated transaction, and credit incentives or credit penalties are imparted to the nodes corresponding to the transaction according to the principle of the credit assessment.

8. The method for assessing SOTIF of autonomous driving based on DAG block chain according to claim 1, wherein in the step 4, a credit balance of a final node is an assessment result; a credit assessment algorithm is used to implement the credit incentives and penalties for the nodes, and is designed, when the terminated transaction is safe transaction, to impart credit penalty to transaction nodes whose data are inconsistent with those of the terminated transaction during backtracing of the path, and to impart credit incentive to the rest of the nodes, and when the terminated transaction is a danger transaction or a hazard transaction, to impart credit incentive to the transaction nodes whose data are inconsistent with those of the terminated transaction, and to impart credit penalty to the rest of the nodes; in terms of credit inventive or credit penalty, the credit incentive is imparted at a time, an effect of which is not strengthened or weakened with the lapse of time, but is gradually weakened with the credit penalty, until the effect of the credit incentives is zeroed, and the effect of the credit penalty is gradually reduced as the number of the transaction paths is increased, and is ineliminable;

an equation for calculating the credit balance is $C_i = C_i^P + C_i^N$, where $C_i$ represents the credit account balance of a node i, $C_i^P$ represents the credit incentive imparted to the node i, and $C_i^N$ represents the credit penalty imparted to the node i;

an equation for calculating the credit incentive is $$C_i^P = \frac{\sum_{k=1}^{n_P} v_k}{n_P},$$

where $n_P$ represents a number of the transaction paths that the node i participates in and that make a positive contribution, among the transaction paths; $v_k$ represents a number of times the node i is verified on a k-th transaction path; the more times the node i is verified, the higher credibility of the node i, and the more credit incentives being imparted; an accumulation of the credit incentive is formulated as an arithmetic average of the number of the transaction paths that the nodes participate in and that make a positive contribution;

an equation for calculating the credit penalty is $$C_i^N = -\frac{\sum_{k=1}^{n_N} v_k}{n_N - k + 1},$$

where $n_N$ represents a number of the transaction paths that the node i participates in and that make a negative contribution, among the transaction paths; $v_k$ represents a number of times the node i is verified on the k-th transaction path; the more times the node i is verified, the deeper the influence of negative effect of the node i in the transaction path, and the stricter the credit penalty being imparted; the degree of the credit penalties in the preceding transaction paths is gradually reduced as the number of the transaction paths is increased.

9. A device, comprising: a memory and a processor;

a computer program is stored in the memory, and, when executed by the processor, is adapted to perform a method for assessing Safety Of The Intended Functionality (SOTIF) of autonomous driving based on DAG block chain, the method comprising the following steps:

step 1: initializing nodes to generate respective full nodes or light nodes and a specific full node manager for all hardware participating in an in-the-loop test, to assign a corresponding public-private key pair, and to create a credit account for all of the full nodes and the light nodes except the manager node and preset a credit coin of equal amount;

step 2: slicing test data in units of test scenes, each time slice being corresponding to a test scene; inputting data of the slice sequentially in chronological order, and outputting a DAG block chain subsequent to inputting of the data of the time slice, each DAG block chain being independent and being in a chronological order, the data of the next time slice being input only after inputting of the data of a previous time slice is completed and credit incentives and penalties for all participating nodes are imparted; during data simulation, taking the data generated from each node as a transaction, a node which generates data being referred as an initiating node of the transaction, a node which receives data being referred as a receiving node of the transaction; a transaction process being that, prior to connecting to the DAG block chain, a new transaction is required to verify two transactions having been connected to the chain, and verification of the transaction following an established transaction verification rule;

step 3: when a transaction path is backtraced, a credit penalty is imparted to participating nodes of a transaction that goes against a data view of a terminated transaction, among all the transactions that are backtraced, and a credit incentive is imparted to the remaining nodes, in a case where the terminated transaction is verified as a safe transaction, and a credit incentive is imparted to a transactor of a transaction that goes against a data view of a terminated transaction, among all the transactions that are backtraced, and a credit penalty is imparted to the remaining nodes, in a case where the terminated transaction is verified as a danger transaction; and step 4: subsequent to the end of the in-the-loop test, outputting credit account balance of each node, and characterizing a hazard of a corresponding node by means of the credit account balance, the lower the credit account balance, the higher the hazard of the node.

10. The device according to claim 9, wherein in the step 1, a node is created based on the hardware in the in-the-loop test firstly, and then the node is assigned with a credit account; attributes of the node are set upon creation of the node, the attributes of the node comprise a node number, a node name, a node type, a node public key, and a node private key; the type of the node is the light node or the full node; the node private key belongs to a private attribute, and is visible only to the node itself; prior to generating nodes for the hardware in the in-the-loop test, a specific virtual full node is generated to act as a manager, and is assumed to be a fully trusted manager node, which is of the same attributes as the light node and the full node, but without the credit account.

11. The device according to claim 10, wherein in the step 1, each node is assigned with a corresponding credit account representative of a credibility of the nodes except for the specific full node, in assigning the credit account; the credit account is changed each time when the transaction path is backtraced, and dynamic information on the change is recorded; the account is composed of an account header and an account content; the account header is used for storing basic information of the account, the account content is used for storing the dynamic information on the account balance change; the basic attributes of the account header comprise an account id, a corresponding node id, and a current balance; the account content comprises a transaction id, a transaction type, number of verifications in the transaction, transaction time and a value of credit coins of the transaction; wherein the transaction type is used for indicating whether the transaction is a credit incentive or a credit penalty, the value of the credit coins of the transaction is positive when the transaction is the credit incentive, and when the transaction is the credit penalty, the value of the credit coins of the transaction is negative.

12. The device according to claim 9, wherein in the step 2, the process of the transaction comprises the data transmission in the in-the-loop test being created as a transaction in real time; a data structure of TX possesses mainly six attributes, including an id of the transaction, a hash value of first two transactions verified by the transaction, the data of the transaction, number of times of the transaction being verified by subsequent transactions, and a hash value of the transaction; the data in the transaction process is encrypted by using a symmetric key, the manager is responsible for distributing and managing the key; after the key is distributed, the transaction is initiated, and the two transactions having been connected to the DAG chain are verified by the initiated transaction, which is a process of transaction verification; the transaction is written into the DAG chain after the transaction verification is successful; in response to the nodes of a last transaction that are not verified by any other transactions, the transaction path is backtraced, and the credit incentives and the credit penalties for the nodes are imparted according to a credit assessment rule.

13. The device according to claim 9, wherein in the step 2, the TX is preconnected to the DAG chain after being created during the transaction verification, and at this time, the TX has not verified designated parent transactions on the chain, such TX is referred as a Tip; after the TX is preconnected to the DAG chain, two designated parent transactions are selected for verification, the TX is formally connected to the DAG chain upon successful verification, waiting for subsequent child transactions to access and verify the TX; the hash values of the first two transactions verified by the transaction are calculated from hash values of the two parent transactions of the transaction; during the transaction verification, the hash values and signatures of the parent transactions are verified, and subsequent to the verification, the combination of the hash values of the two parent transactions that pass the verification are calculated and stored as a Prehash;

an equation for calculating the Prehash is Prehash=Hash(Thash$_1$‖Thash$_2$);

an equation for calculating the Thash is Thash=Hash(TX); and the Thash$_1$ and the Thash$_2$ are the hash values of the two parent transactions, respectively.

14. The device according to claim 9, wherein in the step 2, the transaction verification rule comprises, for selection of a verification object: rule 1, selecting an initiating node that verifies a new transaction as the transaction acting as the receiving nodes; rule 2, backtracing according to the rule 1 by taking the transaction found by the rule 1 as a start point when there are less than two transactions that meet the rule 1, and when two parent transactions are obtained by backtracing, prioritizing direct parent transactions of a transaction at the start point; and rule 3, prioritizing the transactions that are less verified, prioritizing the transaction initiated by the transaction initiating nodes with lower credit when the transactions meet a preceding rule and are verified the same times, and prioritizing the transaction whose transaction initiation time is earlier when the credits of the transaction initiation nodes of multiple transactions are the same; verifying two transactions as the parent transactions of the new transaction when exactly two transactions meet the rule 1, and when only one transaction meets the rule 1, backtracing the transactions based on the principle of the rule 2 by taking the one transaction as a start point, and selecting, among the transactions obtained during backtracing, a transaction of meeting the requirements according to the principle of the rule 3 to form two parent transactions together with the one transaction.

15. The device according to claim 9, wherein in the step 3 involving path backtracing, during backtracing of the path, the property of the terminated transaction is firstly ascertained to determine whether the terminated transaction is a safe transaction or a hazard transaction, and secondly, it is verified whether a data direction of each transaction is consistent with that of the terminated transaction, and credit incentives or credit penalties are imparted to the nodes corresponding to the transaction according to the principle of the credit assessment.

16. The device according to claim 9, wherein in the step 4, a credit balance of a final node is an assessment result; a credit assessment algorithm is used to implement the credit incentives and penalties for the nodes, and is designed, when the terminated transaction is safe transaction, to impart credit penalty to transaction nodes whose data are inconsistent with those of the terminated transaction during backtracing of the path, and to impart credit incentive to the rest of the nodes, and when the terminated transaction is a danger transaction or a hazard transaction, to impart credit incentive to the transaction nodes whose data are inconsistent with those of the terminated transaction, and to impart credit penalty to the rest of the nodes; in terms of credit inventive or credit penalty, the credit incentive is imparted at a time, an effect of which is not strengthened or weakened with the lapse of time, but is gradually weakened with the credit penalty, until the effect of the credit incentives is zeroed, and the effect of the credit penalty is gradually reduced as the number of the transaction paths is increased, and is ineliminable;

an equation for calculating the credit balance is $C_i=C_i^P+C_i^N$, where $C_i$ represents the credit account balance of a node i, $C_i^P$ represents the credit incentive imparted to the node i, and $C_i^N$ represents the credit penalty imparted to the node i;

an equation for calculating the credit incentive is $$C_i^P = \frac{\sum_{k=1}^{n_P} v_k}{n_P},$$

where $n_P$ represents a number of the transaction paths that the node i participates in and that make a positive contribution, among the transaction paths; $v_k$ represents a number of times the node i is verified on a k-th transaction path; the more times the node i is verified, the higher credibility of the node i, and the more credit incentives being imparted; an accumulation of the credit incentive is formulated as an arithmetic average of the number of the transaction paths that the nodes participate in and that make a positive contribution;

an equation for calculating the credit penalty is $$C_i^N = -\frac{\sum_{k=1}^{n_N} v_k}{n_N - k + 1},$$

where $n_N$ represents a number of the transaction paths that the node i participates in and that make a negative contribution, among the transaction paths; $v_k$ represents a number of times the node i is verified on the k-th transaction path; the more times the node i is verified, the deeper the influence of negative effect of the node i in the transaction path, and the stricter the credit penalty being imparted; the degree of the credit penalties in the preceding transaction paths is gradually reduced as the number of the transaction paths is increased.

17. A computer-readable storage medium having stored thereon a computer program, which, when executed by a processor, is adapted to perform a method for assessing Safety Of The Intended Functionality (SOTIF) of autonomous driving based on DAG block chain, comprising the following steps:

step 1: initializing nodes to generate respective full nodes, light nodes and a specific full node manager for all hardware participating in an in-the-loop test, to assign a corresponding public-private key pair, and to create a credit account for all of the full nodes and the light nodes except the manager node and preset a credit coin of equal amount;

step 2: slicing test data in units of test scenes, each time slice being corresponding to a test scene; inputting data of the slice sequentially in chronological order, and outputting a DAG block chain subsequent to inputting of the data of the time slice, each DAG block chain being independent and being in a chronological order, the data of the next time slice being input only after inputting of the data of a previous time slice is completed and credit incentives and penalties for all participating nodes are imparted; during data simulation, taking the data generated from each node as a transaction, a node which generates data being referred as an initiating node of the transaction, a node which receives data being referred as a receiving node of the transaction; a transaction process being that, prior to connecting to the DAG block chain, a new transaction is required to verify two transactions having been connected to the chain, and verification of the transaction following an established transaction verification rule;

step 3: when a transaction path is backtraced, a credit penalty is imparted to participating nodes of a transaction that goes against a data view of a terminated transaction, among all the transactions that are backtraced, and a credit incentive is imparted to the remaining nodes, in a case where the terminated transaction is verified as a safe transaction, and a credit incentive is imparted to a transactor of a transaction that goes against a data view of a terminated transaction, among all the transactions that are backtraced, and a credit penalty is imparted to the remaining nodes, in a case where the terminated transaction is verified as a danger transaction; and step 4: subsequent to the end of the in-the-loop test, outputting credit account balance of each node, and characterizing a hazard of a corresponding node using the credit account balance, the lower the credit account balance, the higher the hazard of the node.

* * * * *